United States Patent
Kauppila et al.

(10) Patent No.: US 11,233,859 B2
(45) Date of Patent: Jan. 25, 2022

(54) MACHINE-TO-MACHINE COMMUNICATIONS

(71) Applicants: Arm IP Limited, Cambridge (GB); Arm Limited, Cambridge (GB)

(72) Inventors: Antti Kauppila, Oulu (FI); Hannes Tschofenig, Tirol (AT)

(73) Assignee: ARM IP LIMITED, Cambridge (GB)

( * ) Notice: Subject to any disclaimer, the term of this patent is extended or adjusted under 35 U.S.C. 154(b) by 0 days.

(21) Appl. No.: 16/670,035

(22) Filed: Oct. 31, 2019

(65) Prior Publication Data

US 2021/0136157 A1    May 6, 2021

(51) Int. Cl.
| | |
|---|---|
| G06F 15/16 | (2006.01) |
| H04L 29/08 | (2006.01) |
| H04L 29/06 | (2006.01) |
| H04W 4/70 | (2018.01) |
| H04L 9/32 | (2006.01) |

(52) U.S. Cl.
CPC .......... *H04L 67/141* (2013.01); *H04L 9/3268* (2013.01); *H04L 63/0823* (2013.01); *H04L 63/166* (2013.01); *H04L 67/42* (2013.01); *H04L 69/02* (2013.01); *H04W 4/70* (2018.02)

(58) Field of Classification Search
CPC ... H04L 67/141; H04L 67/42; H04L 63/0823; H04L 63/166; H04L 69/02; H04L 9/3268; H04W 4/70
See application file for complete search history.

(56) References Cited

U.S. PATENT DOCUMENTS

| | | | | |
|---|---|---|---|---|
| 2003/0226017 A1* | 12/2003 | Palekar | ................... | H04L 63/08 713/168 |
| 2013/0067552 A1* | 3/2013 | Hawkes | ............ | H04W 12/0431 726/7 |
| 2013/0305036 A1* | 11/2013 | Vos | ......................... | H04L 63/08 713/151 |
| 2014/0298415 A1* | 10/2014 | Xie | ..................... | H04L 61/2589 726/3 |
| 2014/0304499 A1* | 10/2014 | Gopinath | .............. | H04L 63/168 713/151 |
| 2015/0142982 A1* | 5/2015 | Gonzales | ............ | H04L 65/1069 709/227 |
| 2015/0288514 A1* | 10/2015 | Pahl | ...................... | H04L 63/166 713/171 |
| 2017/0237742 A1* | 8/2017 | Salmela | .............. | H04L 63/0823 726/4 |
| 2018/0351998 A1* | 12/2018 | Lee | ........................ | H04L 9/0861 |
| 2019/0007836 A1* | 1/2019 | Ocak | ....................... | H04W 4/50 |
| 2019/0182349 A1* | 6/2019 | Goel | .................. | G06F 16/9574 |
| 2019/0238536 A1* | 8/2019 | Chilla | .................. | G06F 21/445 |

\* cited by examiner

*Primary Examiner* — Padma Mundur
(74) *Attorney, Agent, or Firm* — Patterson Thuente Pederson, P.A.

(57) ABSTRACT

A computer implemented method of initiating a communication session between a client device and a server using an authentication key exchange protocol comprising: including the steps of receiving at the server from the client device a first communication to initiate the communication session, the first communication comprising a first session resumption indicator to indicate whether or not session resumption is required to be used by the client device; and establishing, at the server, a session resumption state for the client device based on or in response to a value of the first session resumption indicator.

18 Claims, 5 Drawing Sheets

FIG. 4

MACHINE-TO-MACHINE COMMUNICATIONS

The present techniques generally relate to machine-to-machine communications, and particularly to an authentication key exchange protocol in machine-to-machine communications.

There are ever increasing numbers of devices within the home, other buildings or the outdoor environment that have processing and communication capabilities which allow them to communicate with other entities (e.g. devices, servers, services etc.) within the same network or on a different network (e.g. on the internet) to access servers or services as part of the "Internet of Things", whereby data is generally transmitted between devices and other entities using machine-to-machine (M2M) communication techniques.

For example, a temperature device in a home may gather sensed data and push the sensed data to a remote service (such as an application running in 'the cloud'). The temperature device may then be controlled remotely by the remote service via received command data.

In other examples, a pollution monitoring device in a factory may comprise a sensor to gather information from various chemical sensors and arrange maintenance based on the gathered information; while a healthcare provider may use devices comprising sensors, such as a heart rate monitor to track the health of patients while they are at home.

The present applicant has recognized the need for improved authentication key exchange protocol in (M2M) communication techniques.

According to a first technique there is provided a computer implemented method of initiating a communication session between a client device and a server using an authentication key exchange protocol comprising: receiving at the server from the client device a first communication to initiate the communication session, the first communication comprising a first session resumption indicator to indicate whether or not session resumption is to be enabled for the communication session with the client device; and determining whether or not to establish a session resumption state for the client device based on or in response to a value of the first session resumption indicator.

According to a second technique there is provided a computer implemented method of initiating a communication session between a client device and a server using an authentication key exchange protocol comprising: generating at the client device a first communication to initiate the communication session, the first communication comprising a first session resumption indicator having a value to indicate whether or not session resumption should be enabled at the server transmitting from the client device to the server the first communication.

In a hardware approach, there is provided electronic apparatus comprising logic elements operable to implement the methods of the present technology. In another approach, the computer-implemented method may be realized in the form of a computer program product, tangibly stored in a non-transitory storage medium, and operable in use to cause a computer system to perform the process of the present technology.

The techniques are diagrammatically illustrated, by way of example, in the accompanying drawings, in which.

Broadly speaking, embodiments of the present techniques provide an authentication key exchange protocol in M2M communications, whereby the M2M communications may include lightweight M2M (LwM2M) communications.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter.

Devices, servers, services etc. may exchange data using M2M communications whereby different protocols may be used in different environments and in accordance with different requirements. The Transmission Control Protocol/Internet Protocol (TCP/IP) is a protocol used in communication over the internet. TCP provides reliable, ordered, and error-checked delivery of a stream of octets between applications. IP handles the addressing so that packets are delivered to the correct destination. Above TCP/IP, the Hypertext Transfer Protocol (HTTP) is used as a client/server protocol. A program may send an HTTP request to a server which returns a HTTP response message.

Devices, servers, services etc. could also use any suitable protocols for M2M communications including one or more of: IPv6, IPv6 over Low Power Wireless Standard (6LoW-PAN), Constrained Application Protocol (CoAP), Message Queuing Telemetry Transport (MQTT), HTTP, WebSocket, or directly communicate over the radio link (e.g., ZigBee®, Bluetooth Low Energy, NB-IoT, LoRaWAN), although it will be appreciated that these are examples of suitable protocols. M2M communications are typically required to be secure to reduce the risk that malicious third parties gain access to the data by eavesdropping, tampering, or communication forgery.

To that end, the devices, servers, services etc. may use one or more security protocols to establish a communication session for providing secure communications between entities, whereby a communication session defines a set of security parameters which can be established/negotiated among two or more peers (e.g. device, server, service etc.).

Security protocols may, for example, comprise an authentication key exchange protocol such as a handshake in Transport Layer Security (TLS) or Datagram Transport Layer Security (DTLS), whereby an authentication key exchange protocol is used to generate cryptographic keys (e.g. symmetric and/or asymmetric cryptographic keys)

which the peers use to protect application data for the duration of the communication session. Application data protected by TLS/DTLS may be encoded as plain text, binary TLV, JSON, CBOR, or any other suitable data exchange format.

Figure 1:
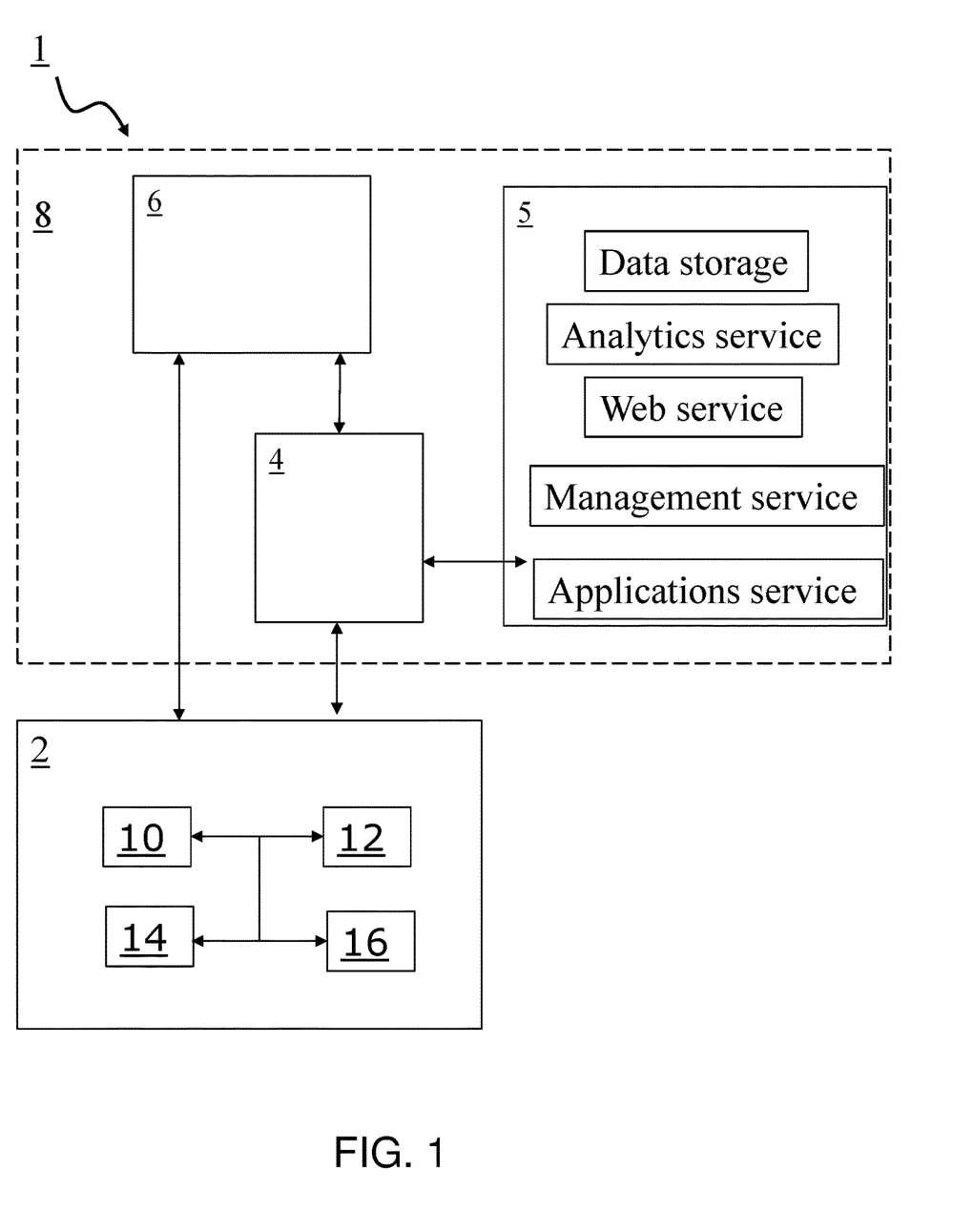
FIG. 1 shows an example deployment scenario for a device according to the present techniques.

FIG. 1 shows a deployment scenario 1 for a device 2 (hereafter "client device", "client" or "device") according to the present techniques.

Client device 2 may be a computer terminal, a laptop, a tablet or mobile-phone, or may, for example, be an Internet of Things (IoT) device running an LwM2M client, although the claims are not limited in this respect. Client device 2 can be used to turn objects into "smart-objects" such as streetlights, electric meters, temperature sensors and building automation, healthcare, and a range of other market segments as part of the IoT. It will be appreciated that the examples of market segments listed above are for illustrative purposes only and the claims are not limited in this respect. Client device 2 is operable to communicate with one or more servers and/or services.

As described herein a server (depicted in FIG. 1 as "server 4" and "server 6") may be a single computing device or software running on a computing device. However, the claims are not limited in this respect and the server may comprise a plurality of interconnected computing devices (or software running on a plurality of interconnected devices), whereby the plurality of interconnected computing devices may be distributed over one or more public and/or private networks.

In the present figures server 4 may, for example, be a LwM2M server, an application server, an edge gateway, a computer terminal, a laptop, a tablet or mobile-phone, or an application hosted on a computing device, and which provides deployment of one or more services (depicted in FIG. 1 as "service 5"). Such services may include one or more of: web service(s); data storage service; analytics service(s), management service(s) and application service(s), although this list is not exhaustive.

In the present figures server 6 comprises a bootstrap server which is operable as a configuration server to provision data on the client device 2 and to provide configuration data operable to configure the client device 2. In embodiments, bootstrap server 6 may be any type of server or remote machine and may not necessarily be a dedicated bootstrap server. Generally speaking, the bootstrap server 6 is any means suitable to perform a bootstrap process with the client device 2 (e.g. machine, hardware, technology, server, software, etc.).

In the present examples, the server 4, bootstrap server 6 and/or services 5 may form part of a device management platform 8, such as the Pelion™ device management platform from Arm®, Cambridge, UK.

The client device 2 comprises communication circuitry 10 for communicating with the one or more servers 4 and/or services b 5.

The communication circuitry 10 may use wireless communication, such as communication such as, for example, one or more of: wireless local area network (Wi-Fi); short range communication such as radio frequency communication (RFID); near field communication (NFC); communications used in wireless technologies such as Bluetooth®, Bluetooth Low Energy (BLE); cellular communications such as 3G or 4G; and the communication circuitry 10 may also use wired communication such as a fibre optic or metal cable. The communication circuitry 10 could also use two or more different forms of communication, such as several of the examples given above in combination.

The client device 2 further comprises processing circuitry 12 for controlling various processing operations performed by the client device 2.

The client device 2 may further comprise input/output (I/O) circuitry 14, such that the client device 2 can receive inputs (e.g. user inputs, sensor inputs, measurement inputs etc.) and/or generate outputs (e.g. audio/visual/control commands etc.).

The client device 2 further comprises storage circuitry 16 for storing data, such as credential data, whereby the storage circuitry 16 may comprise volatile and/or non-volatile memory.

Such credential data may include one or more of: certificates, raw public keys, shared symmetric keys, private keys, identifiers (e.g. direct or indirect identifiers). This credential data may be used by the device to authenticate (e.g. connect, establish secure communications, register, enrol etc.) with one or more remote entities (e.g. a bootstrap server/server/services).

As above, a client device may use one or more security protocols to authenticate with another server, whereby the client device may use an authentication key exchange protocol to mutually authenticate with the server 4 and to negotiate/establish security parameters.

In embodiments the authentication key exchange protocol is a full handshake (e.g. TLS/DTLS handshake), whereby a full handshake involves the exchange of communications between the client device and the server to allow both peers to establish or negotiate security parameters, to allow each peer authenticate the other, to negotiate and to instantiate negotiated security parameters and to report any error conditions.

An example full handshake involves inter alia:
Exchange communications to agree on algorithms. For example, the client device 2 and a server 4, may need to confirm which algorithm(s) or ciphers or cipher suites they will use to secure communication sessions with cryptographic keys.
Exchange the necessary cryptographic parameters needed for use of the proposed algorithms.
Exchange certificates (e.g. X.509 certificates) and cryptographic information to allow the client device and server to authenticate themselves.
Generate a master secret from a premaster secret.
When the full handshake for establishing a communication session is complete the client device and server will be authenticated to one another and will have negotiated algorithms and generated keys to allow for secure communications during a secure communication session.

The full handshake is typically computationally expensive (e.g. due to the public key cryptographic operations), and requires the exchange of a number of messages (including certificates) and is typically burdensome on low end client devices and bandwidth constrained networks (e.g. NB-IoT, LoRaWAN, IEEE 802.15.4 mesh networks).

In a full handshake the server establishes or allocates a session-resumption state, which it can use to resume a communication session with a client device with which it previously completed a full handshake. The session-resumption state is stored in storage (e.g. cache) and identifies an active or resumable session state. For example, the resumption session state may include a start time (when time support is enabled), a client device certificate (e.g. X.509 certificate when certificate support is enabled), agreed cipher suite and compression algorithm, a master secret negotiated during the full handshake, and may also comprise information about the negotiated extensions (e.g. CID, MFL etc.).

The session resumption state may also include metadata to maintain a linked list and the storage entry timeout. Each entry in the session resumption database stored at the server is indexed by some form of identifier, hereafter a "session identifier" or "session ID".

The server provides the client device with the session ID corresponding to the session-resumption state as part of the full handshake, whereby the session ID may comprise a length and value (e.g. up to 32 bytes).

After disconnecting from the communication session, the client device can re-establish the communication session with the server by sending the Session ID in a first message or communication (e.g. "ClientHello") as part of an abbreviated handshake to allow the server to identify the session-resumption state corresponding to the session ID.

When the server identifies a session-resumption state corresponding to the session ID and the server is willing to re-establish the connection under the specified session state, it will send a "ServerHello" with the same session ID. The client device and server can then proceed to reuse the security parameters previously negotiated during a previous full handshake.

In this manner, the server can resume communication sessions with a client device without the client device and server having to perform a full handshake, whereby the client device and server will reuse the security parameters negotiated during the previous full handshake to determine the appropriate cryptographic keys to use. This session resumption mechanism means that client/servers are not required to perform the full handshake every time a client device attempts to re-establish a communication session with the server having already performed a full handshake.

The session resumption functionality is favorable when the client device is, for example, a low-powered device that wakes-up intermittently to send data to a server or when the client device has constrained resources (e.g. processing/communication/power) and where performing a full handshake may be computationally expensive and affect performance by draining the constrained resources of the client device.

Figure 2A:
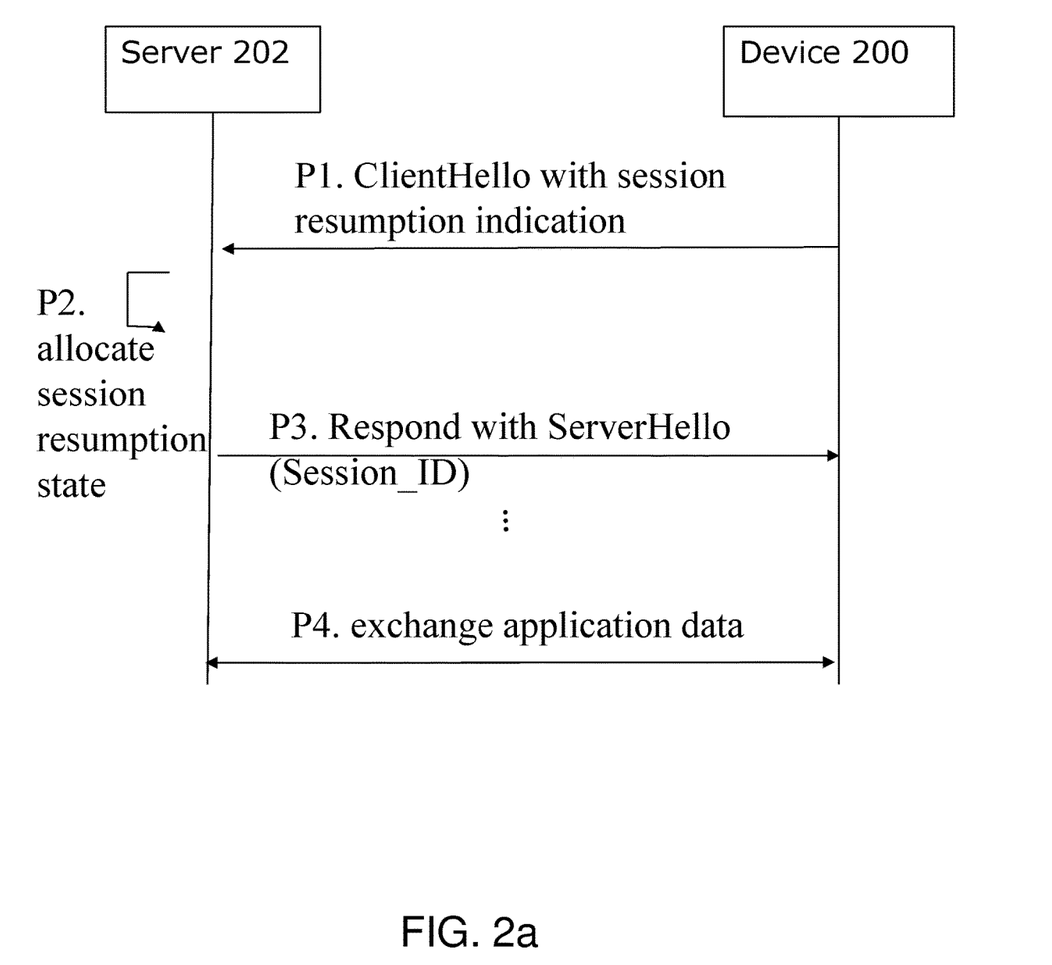
FIG. 2a shows a simplified representation of some of the communications between elements of system in an example handshake.
Figure 2B:
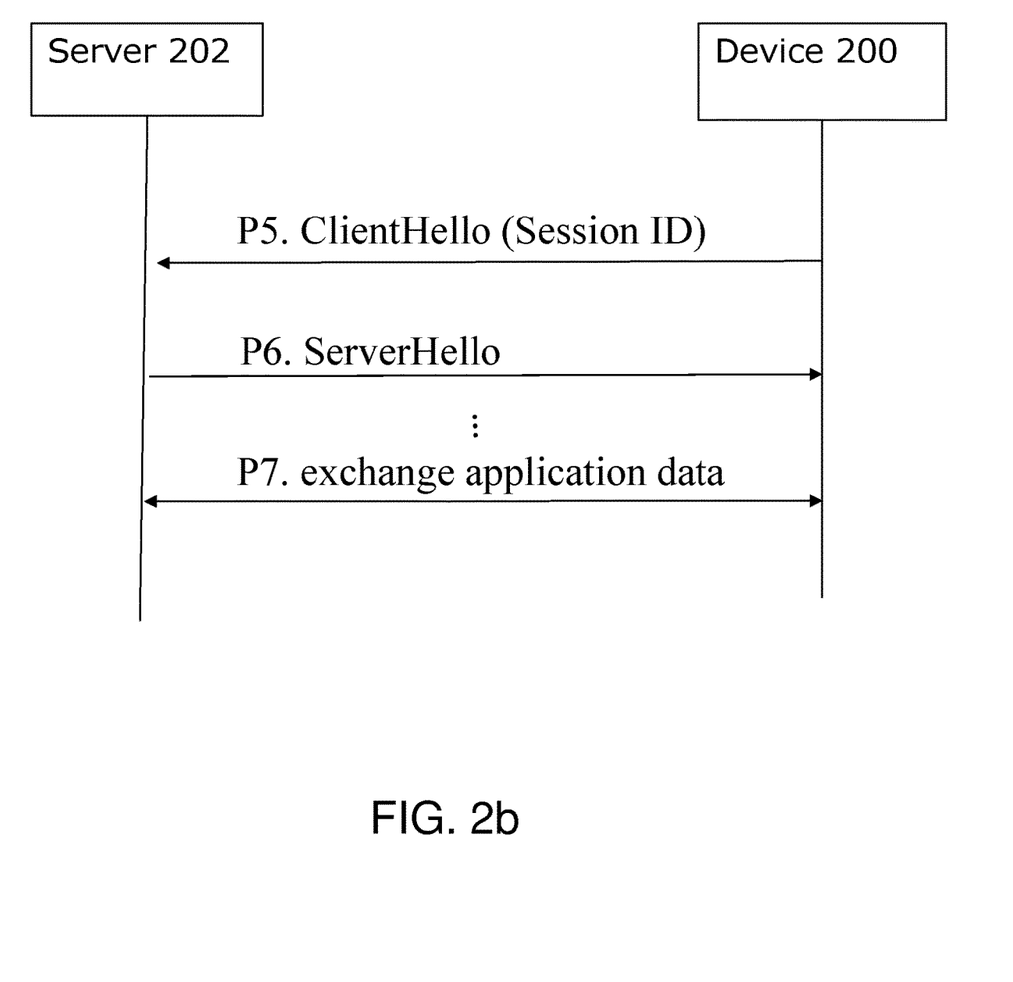
FIG. 2b shows a simplified representation of some of the communications between elements of system in an example abbreviated handshake.

FIG. 2a shows a simplified representation of some of the communications between a client device 200 and server 202 in an example full handshake. FIG. 2b shows a simplified representation of some of the communications between the client device 200 and server 202 in an example abbreviated handshake.

At P1 the client device 200 initiates the full handshake with the server 202 by sending a first communication (e.g. "ClientHello").

At P2 the server establishes a session resumption state for the client device and at P3 continues the handshake and provides inter alia a session ID to the client device.

At P4 the client device and server complete the handshake process and use security parameters negotiated during the full handshake to establish cryptographic keys used to encrypt/verify subsequent communications in a secure manner during a communication session.

After the communication session ends, the client device at P5 attempts to re-establish the communication session with the server by sending inter alia the session ID in a communication (e.g. "ClientHello") as part of an abbreviated handshake to allow the server to identify the session-resumption state corresponding to the session ID.

When the server identifies a session-resumption state corresponding to the session ID and the server agrees to re-establish the connection under the specified session state, it will, as at P6, respond with a "ServerHello", which may include the same session ID value to confirm that session resumption will be utilized. The client device and server can then proceed to reuse security parameters negotiated during the full handshake to establish cryptographic keys used to encrypt/verify subsequent communications in a secure manner during the communication session.

Using the abbreviated handshake to initiate session resumption provides for reduced processing and communications that would otherwise be required for the full handshake. However, to provide session resumption the server must allocate storage to store a session-resumption state for each client device that initiates a full handshake. Such functionality means that that the server allocates storage (e.g. in random-access memory (RAM)) to store a session-resumption state for client devices that will never use the session resumption functionality. While the storage required to store a session resumptions state at the server is in the range of 10's-100's kilobytes (KBs), allocating space for hundreds, thousands, millions etc. of devices will increase the required storage allocation.

Thus, as the number of client devices attempting to establish communication sessions with a server increases, storing session-resumption states for each client device may become burdensome on the server due to, for example, storage and processing requirements.

The use pattern of a client device may determine if session resumption is required to be used, whereby the client device may wake-up only after a previously negotiated security parameter (e.g. a certificate) has expired or has been revoked. In such a scenario the client device will never require session resumption to be enabled at the server and will perform a full handshake with the server each time it attempts to establish a communication session therewith.

In a further illustrative example, a client device may not have any resource constraints and session resumption may not provide any advantage for the client device and so the client device may not require session resumption.

In a further illustrative example an owner of the client device or application developer may not want to utilize session resumption for some reason.

Thus, in an embodiment a server does not establish a session-resumption state for every client device performing a full handshake therewith, and therefore is not required to use processing or allocate storage to establish and store a session-resumption state for those devices that do not require session resumption.

Figure 3:
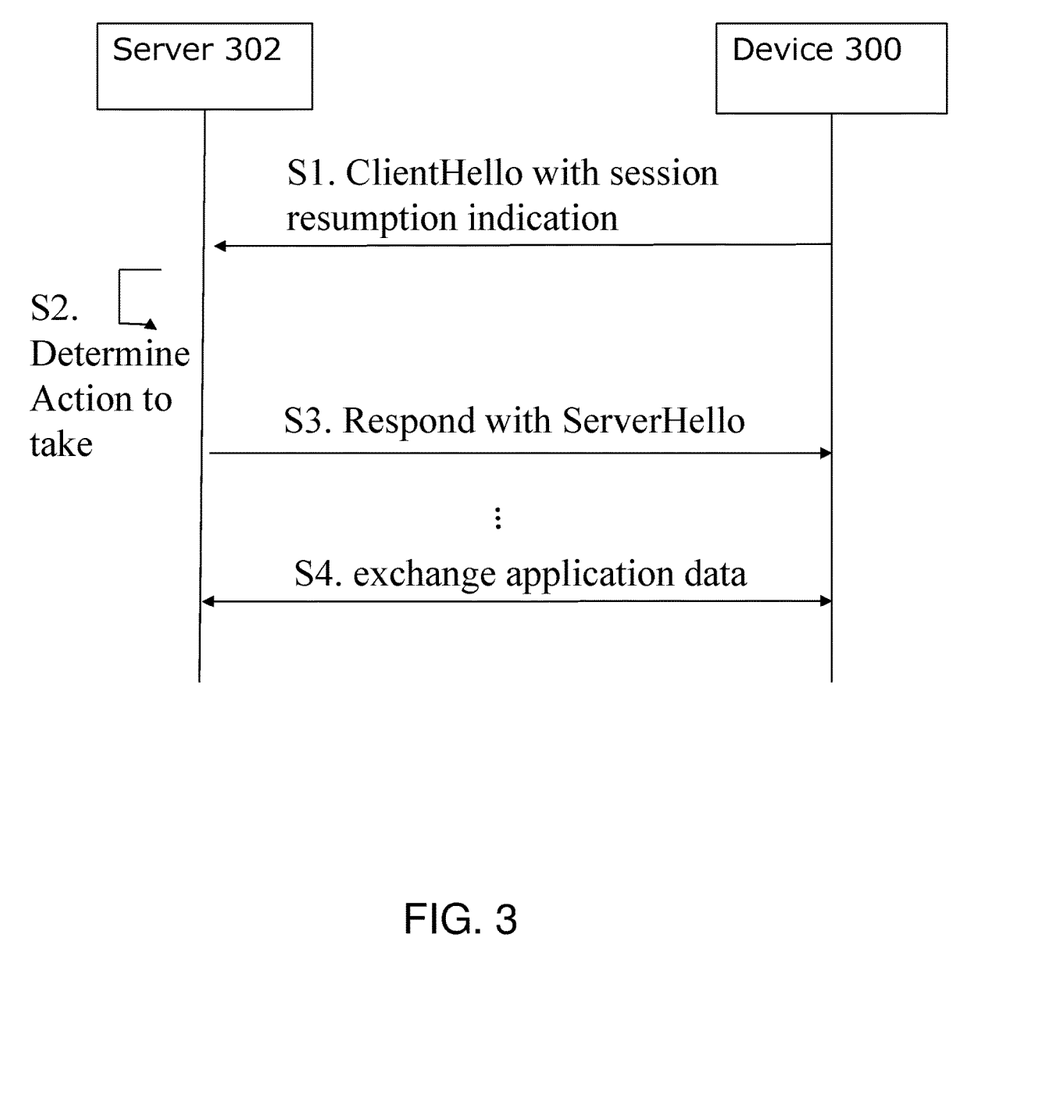
FIG. 3 shows a simplified representation of some of the communications between elements of a system in an authentication key exchange protocol according to an embodiment of the present technology.

FIG. 3 shows a simplified representation of some of the communications between a client device 300 and server 302 in an authentication key exchange protocol according to an embodiment of the present technology, where client device 300 indicates that it does not require or does not intend to use session resumption, and, therefore, session resumption should not be enabled at the server. The authentication key exchange protocol in FIG. 3 comprises a full handshake, whereby at S1 the client device 300 transmits a first communication (e.g. "ClientHello") to the server 302 to initiate the full handshake, whereby the first communication includes a session resumption indicator to inform the server 302 as to whether or not to enable session resumption.

The session resumption indicator may take any suitable form to represent the indication as will be described in further detail below.

At S2 on receiving and processing the first communication with the session resumption indicator, the server can take appropriate action depending on the value of the session resumption indicator.

For example, when the session resumption indicator is a value to indicate that the client device does not require session resumption, and that it should not be enabled at the server, then the server will not establish or allocate a session-resumption state for the client device in storage. Alternatively, when the session resumption indicator is a value to indicate that the client device does require session resumption, and that it should be enabled at the server, then the server will allocate a session-resumption state for the client device in storage.

To enable a client device to indicate whether or not it requires session resumption, and therefore whether the server should or should not allocate a session resumption state, the client device may use an extension in the "ClientHello" communication, called, in the following illustrative example, 'want_use_session_resumption'. The extension type is specified as follows:

```
enum {
    want_use_session_resumption(TBD1), (65535)
} Extension Type;
```

The extension_data field of this extension, when included in the ClientHello contains the sessionResumption structure comprising a session resumption indicator being a value of a flag field.

```
struct {
    uint8 flag;
} sessionResumption;
```

A value of zero (0) for the flag field may indicate that the client device does not require session resumption, and that session resumption should not be enabled at the server. A value of one (1) for the flag field may indicate that the client device does require session resumption, and that session resumption should be enabled at the server.

Although a flag field having unsigned integer value of zero (0) or one (1) is used in the illustrative example above the claims are not limited in this respect and the session resumption indicator may comprise: one or more characters, one or more integer values, one or more floating-point values, one or more Boolean values etc.

The use of an extension in the "ClientHello" communication is for illustrative purposes only, and the client device may use a suitable session resumption indicator at any suitable time during the key authentication protocol to indicate whether or not session resumption is to be enabled.

The server continues the handshake and at S3 responds with a "ServerHello" communication. The "ServerHello" communication may also include a session resumption confirmation indicator whereby, in an illustrative example, the session resumption confirmation indicator comprises a flag field whereby a value of zero (0) for the flag field indicates that the server acknowledges the client does not require session resumption and the server will not enable session resumption or establish a session resumption state. A value of one (1) for the flag field indicates that the server acknowledges that session resumption is required to be enabled. Additionally, or alternatively to the acknowledgement that session resumption is required the server may provide the session ID to the client device when the client device indicates that session resumption is to be enabled.

The client device and server can then continue to complete the full handshake to negotiate security parameters as set out previously, to the point at S4 where application data is exchanged in a secure manner using cryptographic keys based on or in response to the security parameters.

A purpose of the session resumption indicator is to enable the server to only allocate the session resumption state for client devices which require the session resumption mechanism to be enabled. Such functionality means that the server will not allocate space in storage to store a session resumption state for client devices that do not require the mechanism, thereby reducing the amount of storage that would otherwise be required.

Such functionality may be particularly useful in scenarios where client devices do not require session resumption to be enabled or where client devices re-connect to servers on an irregular basis or with long time periods in between such that the cryptographic keys expire before session resumption would be required.

The benefit of not enabling session resumption at the server may be realized as the number of client devices connecting to a server increases because the server will not allocate storage for client devices that do not require session resumption.

Such functionality also means that the server does not need to provide the session ID to the client device so the amount of data sent from the server to the client device in the handshake may be reduced in comparison to known authentication key exchange protocols. Further the processing required to allocate a session resumption state is not required.

When the session resumption indicator indicates that the client device does require session resumption, and the server supports session resumption with the client device, then the server enable session resumption and allocate a session-resumption state for the client device in storage. The client device and server can then continue to complete the full handshake as set out previously, and the client device can, after disconnecting from the communication session, re-establish a communication session using a session ID provided by the server during the full handshake. Thus, the server need only allocate storage and processing power to create and store the session resumption state for client devices that actually require session resumption to be enabled.

In embodiments the client device can set the value of the session resumption indicator each time a full handshake is initiated. Thus, the client device may determine when to use session resumption on a case by case basis, driven by the context the client device is in or via policy.

The value of the session resumption indicator can be set depending on, for example, one or more properties of the client device, one or more properties of the server with which the client intends to perform the authentication key exchange protocol and/or one or more properties of the network(s) through which the client device communicates with the server. For example, the session resumption may not be required when a battery level of the client device is above a threshold level; or the session resumption may be required when the battery of the client device is below a threshold level. In a further example, the session resumption may not be required when the bandwidth of a communication channel is above a threshold level; or the session resumption may be required when the bandwidth of a communication channel is below a threshold level. In a further example, the session resumption may not be required when a first server does not support or select a particular cipher suite; or the session resumption may be required when the first server does support a particular cipher suite.

In some embodiments the session resumption indicator may have a value to indicate to the server that session resumption is to be enabled dependent on one or more criteria being met. Such criteria may relate to one or more properties of the client device, the server and/or the network(s) through which the client device and server communicate.

For example, the session resumption indicator may have a value to indicate that the client device will only require session resumption when a particular cipher suite is selected by the server, or when communicating using a particular transport protocol (e.g. HTTP), or the session resumption indicator may indicate that the use of session resumption is dependent on memory requirements, processing requirements or power requirements on the client device or on the server which the server should check before proceeding to allocate the session resumption state. Thus, the session resumption indicator can communicate the circumstances when session resumption is required to be used by the client device, and therefore the circumstances when the server is to enable the session resumption for the communication session.

Although the session resumption indicator is described as being transmitted from the client device in the first communication of the handshake the claims are not limited in this respect and the session resumption indicator can be sent from the client device at any time during the handshake.

As a further illustrative example, the server may establish or allocate a session resumption state during a full handshake and, subsequent to the full handshake being performed determine that the client device will not require session resumption, e.g. by analysing previous behavior of the client device whereby the client device may have performed 'n' full handshakes (where n is an integer), but whereby the client device never or only rarely performed an abbreviated handshake. When the server determines that the client device is unlikely to require session resumption it will not establish or allocate session resumption state.

Similarly, when the server determines that the client device is unlikely to require session resumption having already allocated a session resumption state it will deallocate or delete a stored session resumption state and the client device will have to perform a full handshake even if it responds with a session ID previously provided by the server. Thus, the server can reduce the burden on storage circuitry by deleting the stored session resumption state for client devices, thereby disabling session resumption from those client devices which it determines will never use or are unlikely to ever use session resumption.

Figure 4:
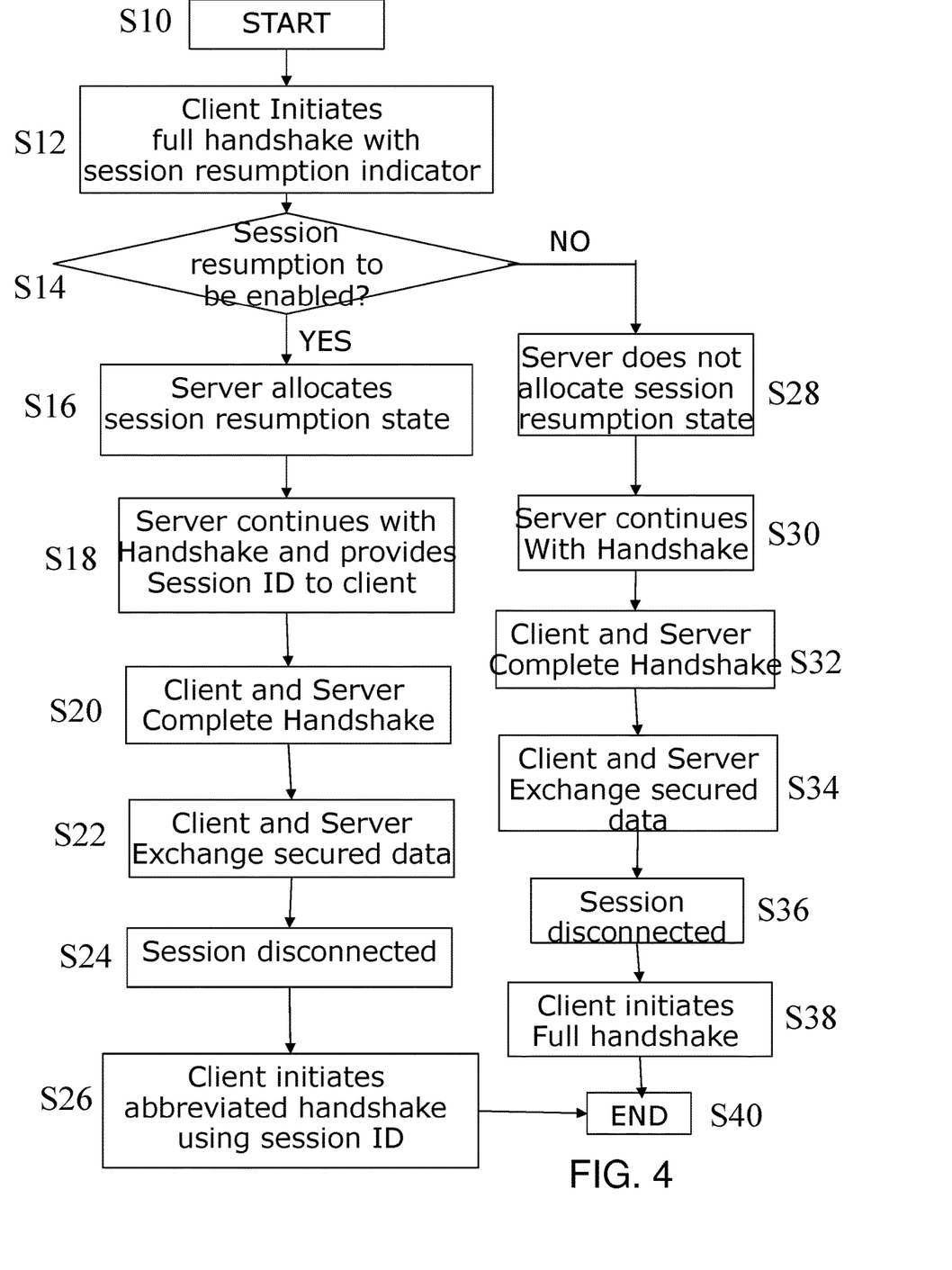
FIG. 4 shows a flow diagram of example steps of an authentication key exchange protocol process.

FIG. 4 shows a flow diagram of example steps of an authentication key exchange protocol comprising a handshake between a client device and server to establish a communication session.

At S10 the process starts. At S12 the client device initiates the handshake with the server by sending a first communication (e.g. "ClientHello") having a session resumption indicator.

S14, when session resumption is required to be enabled for the communication session, the client device sets a session resumption indicator value to indicate that session resumption is to be enabled at the server for the communication session with the client device.

At S16, when session resumption is supported by the server, the server establishes or allocates a session resumption state for the client device and at S18 continues the handshake and provides inter alia a session ID to the client device. At S20 the client device and server complete the handshake process and use security parameters negotiated during the full handshake to establish cryptographic keys used to encrypt/verify subsequent communications in a secure manner during a communication session.

At S24 the communication session is disconnected, and at S26 the client device initiates an abbreviated handshake using the session ID to resume the communication session using previously negotiated security parameters.

S14, when session resumption is not required to be enabled for the communication session, the client device sets a session resumption indicator value to indicate that that session resumption is not to be enabled at the server for the communication session.

At S28 the server does not establish or allocate a session resumption state for the client device and at S30 continues the full handshake. At S32 the client device and server complete the handshake process and at S34 the client device and server exchange data in a secure manner using cryptographic keys negotiated during the handshake. At S36 the communication session is disconnected, and at S38 the client device initiates another full handshake to establish a new communication session.

While the embodiments above generally describe authentication key exchange protocol being handshakes, the claims are not limited in this respect and the techniques may be applied to other types of authentication key exchange protocols which use session resumption, and may include an Ephemeral Diffie-Hellman Over COSE (EDHOC) or any other suitable protocol.

Embodiments of the present techniques may provide implementations which conform to the Open Mobile Alliance Lightweight Machine to Machine Technical Specification, Version 1.0 and to one or more revision(s) thereof although the claims are not limited in this respect.

Embodiments of the present techniques may provide implementations which conform to the DTLS Protocol, Version 1.0 and to one or more revision(s) thereof although the claims are not limited in this respect.

Embodiments of the present techniques also provide a non-transitory data carrier carrying code which, when implemented on a processor, causes the processor to carry out the methods described herein.

The techniques further provide processor control code to implement the above-described methods, for example on a general-purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object-oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realized in the form of a data carrier having functional data thereon, the functional data comprising functional computer data structures to, when loaded into a computer system or network and operated upon thereby, enable the computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognize that present techniques have a broad range of applications, and that the embodiments may take a wide range of modifications without departing from any inventive concept as defined in the appended claims.

Accordingly, some features of the disclosed embodiments are set out in the following numbered items:

1) A computer implemented method of initiating a communication session between a client device and a server using an authentication key exchange protocol comprising:
receiving at the server from the client device a first communication to initiate the communication session, the first communication comprising a first session resumption indicator to indicate whether or not session resumption is to be enabled for the communication session with the client device; and determining whether or not to establish a session resumption state for the client device based on or in response to a value of the first session resumption indicator.

2) The method of item 1, further comprising:
establishing, at the server, a session resumption state for the communication session with the client device when the value of the first session resumption indicator indicates that session resumption is to be enabled for the communication session with the client device.

3) The method of item 1, further comprising:
establishing, at the server, the communication session with the client device without establishing a session resumption state for the communication session when the value of the first session resumption indicator indicates that session resumption is not to be enabled for the communication session.

4) The method of item 1, wherein the value of the first session resumption indicator is set to indicate to the server that session resumption is required dependent on one or more criteria.

5) The method of item 4, further comprising:
determining, at the server, whether the one or more criteria are met; and
establishing, at the server, the session resumption state based on or in response to the determination.

6) The method of item 4, wherein the one or more criteria relate to one or more properties of the client device, the server and/or a network.

7) The method of item 1, wherein the value of the first session resumption indicator comprises one or more of: a character value, an integer value, a floating-point value and a Boolean value.

8) The method of item 1, wherein the value of the first session resumption indicator is set by the client device dependent on: one or more properties of the client device, the server and/or a network.

9) The method of item 2 comprising:
sending, from the server to the client device, a confirmation indicator to confirm that a session resumption state for the client device is established at the server.

10) The method of item 3 comprising:
sending, from the server to the client device, a confirmation indicator to confirm that a session resumption state for the client device is not established at the server.

11) The method of item 1 further comprising:
receiving at the server from the client device a second communication to initiate a further communication session, the second communication comprising a second session resumption indicator to indicate whether or not session resumption is to be enabled for the further communication session;
determining whether or not to establish a session resumption state for the client device based on or in response to a value of the second session resumption indicator.

12) The method of item 11 wherein the value of the second session resumption indicator is different from the value of the first session resumption indicator.

13) The method of item 1, wherein the authentication key exchange protocol is a TLS/DTLS handshake 14) The method of item 1 wherein the client device is an LwM2M device and/or wherein the server is an LwM2M server.

15) A computer implemented method of initiating a communication session between a client device and a server using an authentication key exchange protocol comprising:
generating at the client device a first communication to initiate the communication session, the first communication comprising a first session resumption indicator having a value to indicate whether or not session resumption should be enabled at the server;
transmitting from the client device to the server the first communication.

16) The method of item 15 further comprising:
determining, at the client device, whether session resumption is required.

17) The method of item 16, further comprising:
setting the value of the first session resumption indicator based on or in response to the determination.

18) The method of item 15, wherein the value of the first session resumption indicator is set by the client device dependent on: one or more properties of the client device, the server and/or a network.

19) The method of item 15, wherein the value of the first session resumption indicator is set to indicate to the server that session resumption is required dependent on one or more criteria being met.

20) A non-transitory data carrier carrying code which, when implemented on a processor, causes the processor to carry out a method of initiating a communication session between a client device and a server using an authentication key exchange protocol comprising:
receiving at the server from the client device a first communication to initiate the communication session, the first communication comprising a first session resumption indicator to indicate whether or not session resumption is to be enabled for the communication session with the client device; and determining whether or not to establish a session resumption state for the client device based on or in response to a value of the first session resumption indicator.

The invention claimed is:

1. A computer implemented method of initiating a communication session between a client device and a server using an authentication key exchange protocol handshake comprising a sequence of communications, the method comprising:
receiving at the server from the client device a first communication in the sequence to initiate the communication session, the first communication in the sequence comprising a first session resumption indicator having a value as the value of the first session resumption indicator to indicate whether or not session resumption is to be enabled for the communication session with the client device, wherein the value of the first session resumption indicator is set to indicate to the server that session resumption is required dependent on one or more criteria; and determining whether or not the server is to establish a session resumption state for the client device based on or in response to the value of the first session resumption indicator.

2. The method of claim 1, further comprising:
establishing, at the server, a session resumption state for the communication session with the client device when the value of the first session resumption indicator indicates that session resumption is to be enabled for the communication session with the client device.

3. The method of claim 1, further comprising:
establishing, at the server, the communication session with the client device without establishing a session resumption state for the communication session when the value of the first session resumption indicator indicates that session resumption is not to be enabled for the communication session.

4. The method of claim 1, further comprising:
determining, at the server, whether the one or more criteria are met; and establishing, at the server, the session resumption state based on or in response to the determination.

5. The method of claim 1, wherein the one or more criteria relate to one or more properties of the client device, the server and/or a network.

6. The method of claim 1, wherein the value of the first session resumption indicator comprises one or more of: a character value, an integer value, a floating-point value and a Boolean value.

7. The method of claim 2 comprising:
sending, from the server to the client device, a confirmation indicator to confirm that a session resumption state for the client device is established at the server.

8. The method of claim 3 comprising:
sending, from the server to the client device, a confirmation indicator to confirm that a session resumption state for the client device is not established at the server.

9. The method of claim 1 further comprising:
receiving at the server from the client device a second communication to initiate a further communication session, the second communication comprising a second session resumption indicator having a value as the value of the second session resumption indicator to indicate whether or not session resumption is to be enabled for the further communication session;
determining whether or not to establish a session resumption state for the client device based on or in response to the value of the second session resumption indicator.

10. The method of claim 9 wherein the value of the second session resumption indicator is different from the value of the first session resumption indicator.

11. The method of claim 1, wherein the authentication key exchange protocol is a TLS/DTLS handshake.

12. The method of claim 1 wherein the client device is an LwM2M device and/or wherein the server is an LwM2M server.

13. A computer implemented method of initiating a communication session between a client device and a server using an authentication key exchange protocol handshake comprising a sequence of communications, the method comprising:
generating at the client device a first communication in the sequence to initiate the communication session, the first communication in the sequence comprising a first session resumption indicator having a value as the value of the first session resumption indicator to indicate whether or not session resumption should be enabled at the server, wherein the value of the first session resumption indicator is set by the client device dependent on: one or more properties of the client device, the server and/or a network;
transmitting from the client device to the server the first communication.

14. The method of claim 13 further comprising:
determining, at the client device, whether session resumption is required.

15. The method of claim 14, further comprising:
setting the value of the first session resumption indicator based on or in response to the determination.

16. The method of claim 13, wherein the value of the first session resumption indicator is set to indicate to the server that session resumption is required dependent on one or more criteria being met.

17. A non-transitory data carrier carrying code which, when implemented on a processor, causes the processor to carry out the method according to claim 1.

18. A computer implemented method of initiating a communication session between a client device and a server using an authentication key exchange protocol handshake comprising a sequence of communications, the method comprising:
receiving at the server from the client device a first communication in the sequence to initiate the communication session, the first communication in the sequence comprising a first session resumption indicator having a value as the value of the first session resumption indicator to indicate whether or not session resumption is to be enabled for the communication session with the client device, wherein the value of the first session resumption indicator is set by the client device dependent on: one or more properties of the client device, the server and/or a network; and determining whether or not the server is to establish a session resumption state for the client device based on or in response to the value of the first session resumption indicator.

\* \* \* \* \*